(12) United States Patent
Zhang

(10) Patent No.: US 10,516,814 B2
(45) Date of Patent: Dec. 24, 2019

(54) CAMERA ASSEMBLY AND ELECTRONIC DEVICE

(71) Applicant: GUANGDONG OPPO MOBILE TELECOMMUNICATIONS CORP., LTD., Dongguan, Guangdong (CN)

(72) Inventor: Xiang Zhang, Guangdong (CN)

(73) Assignee: GUANGDONG OPPO MOBILE TELECOMMUNICAITONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 16/204,803

(22) Filed: Nov. 29, 2018

(65) Prior Publication Data
US 2019/0230260 A1    Jul. 25, 2019

(30) Foreign Application Priority Data

Jan. 23, 2018 (CN) .......................... 2018 1 0064879

(51) Int. Cl.
*H04N 5/225* (2006.01)
*H01Q 1/24* (2006.01)
*H04M 1/02* (2006.01)
*G03B 17/04* (2006.01)

(52) U.S. Cl.
CPC .......... *H04N 5/2253* (2013.01); *G03B 17/04* (2013.01); *H01Q 1/243* (2013.01); *H04M 1/0264* (2013.01); *H04N 5/2257* (2013.01)

(58) Field of Classification Search
CPC ....... H04W 84/18; H04W 4/38; H04W 88/02; H04N 5/222; H04N 5/33
See application file for complete search history.

(56) References Cited

U.S. PATENT DOCUMENTS

| 5,907,730 | A | 5/1999 | Tseng et al. |
| 2006/0261248 | A1 | 11/2006 | Hwang |
| 2006/0261257 | A1 | 11/2006 | Hwang |

(Continued)

FOREIGN PATENT DOCUMENTS

| CN | 201039226 Y | 3/2008 |
| CN | 203722714 U | 7/2014 |

(Continued)

OTHER PUBLICATIONS

International search report, PCT/CN2018/117493, dated Feb. 25, 2019 (8 pages).

(Continued)

*Primary Examiner* — Diane D Mizrahi
(74) *Attorney, Agent, or Firm* — Ladas & Parry LLP

(57) ABSTRACT

The present disclosure provides a camera assembly and an electronic device. The camera assembly includes a camera module, a motor and a transmission module. The transmission module is connected between the camera module and the motor. The motor is configured to drive the transmission module so as to drive the camera module to move. The transmission module defines at least one concave part set on a lateral wall of the transmission module. Thus, an empty space may be formed above the concave part. In the electronic device, the empty space may be utilized as the clearance area of the antenna radiator inside the electronic device. Therefore, the performance of the antenna installed close to the camera module may be improved.

16 Claims, 9 Drawing Sheets

(56) References Cited

U.S. PATENT DOCUMENTS

| | | | |
|---|---|---|---|
| 2010/0002126 A1 | 1/2010 | Wenstrand et al. | |
| 2013/0162852 A1* | 6/2013 | Boyle | H04N 5/23203 348/211.99 |
| 2014/0204230 A1* | 7/2014 | Boyle | H04N 5/23203 348/211.99 |
| 2015/0035437 A1* | 2/2015 | Panopoulos | F21V 14/02 315/112 |
| 2016/0056530 A1 | 2/2016 | Lee et al. | |

FOREIGN PATENT DOCUMENTS

| | | |
|---|---|---|
| CN | 205313743 U | 6/2016 |
| CN | 206433032 U | 8/2017 |
| JP | 2005086390 A | 3/2005 |
| JP | 2007155881 A | 6/2007 |

OTHER PUBLICATIONS

European search report for Application No. EP18208503.5, dated May 27, 2019 (10 pages).

* cited by examiner

CAMERA ASSEMBLY AND ELECTRONIC DEVICE

CROSS-REFERENCE TO RELATED APPLICATIONS

The present application claims foreign priority of Chinese Patent Application No. 201810064879.4, filed on Jan. 23, 2018 in the State Intellectual Property Office of China, the entire contents of which are hereby incorporated by reference.

TECHNICAL FIELD

The present disclosure relates to electronic devices, and in particular to a camera assembly and an electronic device.

BACKGROUND

As the development of communication technology, mobile electronic devices such as cell phones and laptops are more and more frequently used in people's daily life.

Camera module is the main electronic component of electronic device for photographing. In prior art, the camera module installed in the electronic device may have influence on the antenna close to the camera module. Accordingly, the transmitting and receiving performance of the antenna may be degraded.

BRIEF DESCRIPTION OF THE DRAWINGS

To better describe the technical solution of this application, a brief description of all the drawings used in this application will be provided as below. Clearly these drawings below are only examples for this application. For those skilled in the art, other drawings can be obtained based on the ones below easily without much of the creative work.

DETAILED DESCRIPTION

Figure 1:
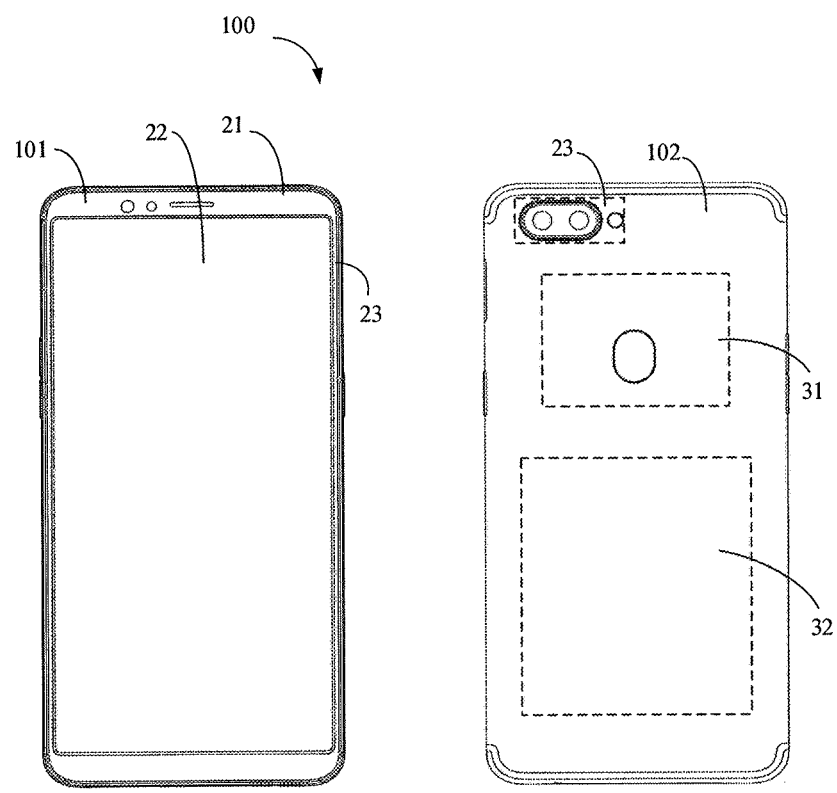
FIG. 1 is a schematic structural view of an electronic device according to an embodiment of the present disclosure.

Technical solutions in embodiments of the present disclosure are hereinafter described clearly with reference to accompanying drawings in embodiments of the present disclosure. Apparently, embodiments described are a part of embodiments of the present disclosure, but not all embodiments. All other embodiments obtained by those skilled in the art based on the embodiments in the present disclosure without creative labor are within the protection scope of the present disclosure.

In the specification, it is to be understood that terms such as "central", "longitudinal", "lateral", "length", "width", "thickness", "upper", "lower", "front", "rear", "left", "right", "vertical", "horizontal", "top", "bottom", "inner", "outer", "clockwise" and "counterclockwise" should be construed to refer to the orientation as then described or as shown in the drawings under discussion. These relative terms are for convenience of description and do not require that the present disclosure be constructed or operated in a particular orientation. In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present disclosure, "a plurality of" means two or more than two, unless specified otherwise.

In the present disclosure, unless specified or limited otherwise, terms "mounted", "connected", "coupled" and the like are used in a broad sense, and may include, for example, fixed connections, detachable connections, or integral connections; may also be mechanical or electrical connections; may also be direct connections or indirect connections via intervening structures; may also be inner communications of two elements, as can be understood by those skilled in the art depending on specific contexts.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on", "above" or "on top of" a second feature may include an embodiment in which the first feature is right or obliquely "on", "above" or "on top of" the second feature, or just means that the first feature is at a height higher than that of the second feature; while a first feature "below", "under" or "on bottom of" a second feature may include an embodiment in which the first feature is right or obliquely "below", "under" or "on bottom of" the second feature, or just means that the first feature is at a height lower than that of the second feature.

Various embodiments and examples are provided in the following description to implement different structures of the present disclosure. In order to simplify the present disclosure, certain elements and settings will be described.

However, these elements and settings are only by way of example and are not intended to limit the present disclosure. In addition, reference numerals may be repeated in different examples in the present disclosure. This repeating is for the purpose of simplification and clarity and does not refer to relations between different embodiments and/or settings. Furthermore, examples of different processes and materials are provided in the present disclosure. However, it would be appreciated by those skilled in the art that other processes and/or materials may be also applied.

Referring to FIG. 1, an electronic device 100 is provided according to an embodiment of the present disclosure.

The electronic device 100 may include a front case 101 and a back case 102. The front case 101 may be utilized to protect the cover plate 21, the display screen 22 and the like. The front case 101 and the back case 102 may cooperatively define an accommodating space for receiving other components such as a camera assembly 23, a circuit board 31 and a battery 32.

In some embodiments, the front case 101 and the back case 102 may be metal cases. It should be noted that, the material of the front case 101 and the back case 102 is not limited herein. For example, the front case 101 and the back case 102 may include both a plastic portion and a metal portion. Alternatively, the front case 101 and the back case 102 may be plastic cases.

The cover plate 21 may be made of glass, sapphire, plastic, etc., and may be utilized to protect the display screen 22. The cover plate 21 may prevent dust, water or oil from adhering to the display screen 22, and prevent the display screen 22 from corrosion in external environment and from damage due to external impact.

The cover plate 21 may include a display portion and a non-display portion. The display portion is transparent and correspond to the light-emitting surface of the display screen 22. The non-display portion may be opaque, which can shield the inner structure of the electronic device 100. Within the non-display portion there may be formed open holes for transmitting sound or light.

It should be understood that, the electronic device 100 may have a bezel-less structure, where the non-display portion is not arranged.

Figure 2:
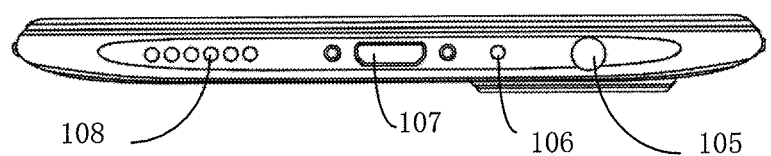
FIG. 2 is a side view of an electronic device according to an embodiment of the present disclosure.

Referring to FIG. 2, the electronic device 100 may define on its outer edge a headphone hole 105, a microphone hole 106, a USB hole 107 and a loudspeaker hole 108. The headphone hole 105, the microphone hole 106, the USB hole 107 and the loudspeaker hole 108 may be through holes.

Figure 3:
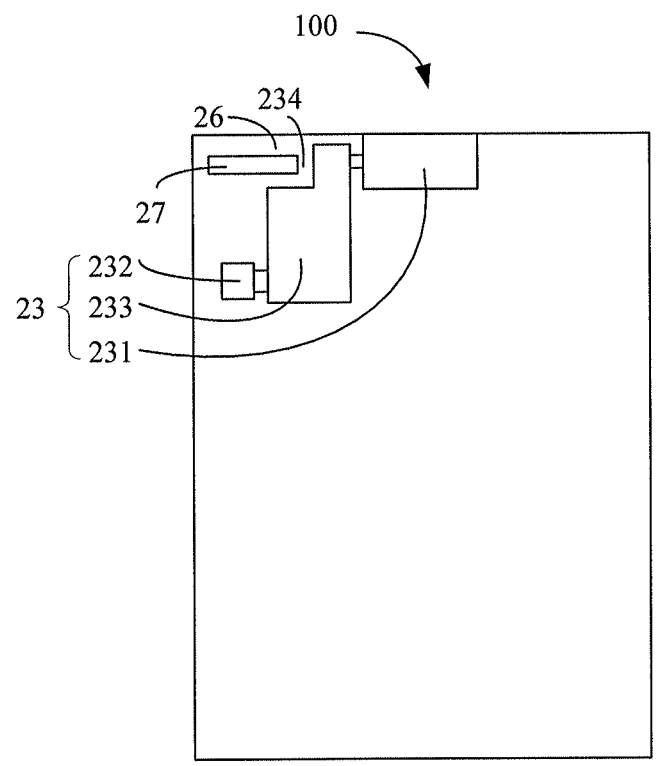
FIG. 3 is a schematic structural view of an electronic device according to an embodiment of the present disclosure.

Referring to FIG. 3, the camera assembly 23 may include a camera module 231, a motor 232 and a transmission module 233. The transmission module 233 may be connected between the camera module 231 and the motor 232. The motor 232 may drive the transmission module 233 so as to drive the camera module 231 to move. The transmission module 233 may define at least one concave part 234. The concave part 234 may be located on the lateral wall of the transmission module 233.

In some embodiments, the electronic device 100 may include an antenna radiator 27 attached, adhered or mounted on the inner or outer surface of one of its frames, such as the front case 101, the back case 102 or a middle frame (not shown). Alternatively, the antenna radiator 27 may not be attached to the frame but disposed inside the electronic device (e.g., be connected to the main board). In both circumstances, the antenna radiator 27 may be located in the space defined by the concave part 234 and kept distanced from the camera assembly 23. That is, the concave part 234 may be utilized to receive the antenna radiator. Thus, the function of the antenna radiator 27 may be ensured, and the compactness of the inner structure of the electronic device 100 may be improved.

In other embodiments, the antenna radiator 27 may be at least part of one frame (e.g., the front case 101, the back case 102 or a middle frame) of the electronic device 100. For example, the middle frame may be made of metal, and act as an antenna radiator 27. A feed circuit (not shown) may be disposed inside the electronic device 100 (e.g., fixed to the middle frame or the main board), and be connected with the part of the middle frame which acts as the antenna radiator 27. In this situation, the existence of the concave part 234 may increase the distance between the antenna radiator 27 (or the frame of the electronic device) and the camera assembly 23, which may provide a clearance area for the antenna radiator 27. That is, the concave part 234 may be utilized as the clearance area of the antenna radiator 27. Therefore, the performance of the antenna radiator 27 may be improved. It should be understood by those of ordinary skill in the art, the frame (e.g., the front case 101, the back case 102 or the middle frame) may act as the antenna radiator 27 as a whole, or only part of the frame may act as the antenna radiator 27 while the other part does not. In some embodiments, the frame may include several independent antenna radiators spaced apart from each other.

Figure 4:
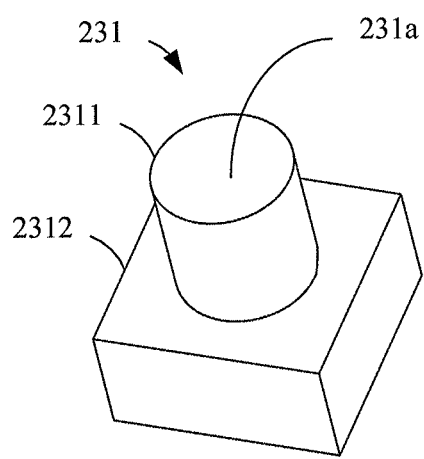
FIG. 4 is a perspective view of a camera module according to an embodiment of the present disclosure.

Referring to FIG. 4, the camera module 231 may include only one camera. Alternatively, the camera module 231 may include two cameras. The camera module 231 may further include a camera and a flash. In this embodiment, the camera module 231 may include a lens 2311 and a chassis 2312. The lens 2311 may have a photographing surface 231a. The lens 2311 may be installed on the chassis 2312. In other embodiments, there may also be integrated a flash and a sound receiver on the chassis 2312.

Figure 5:
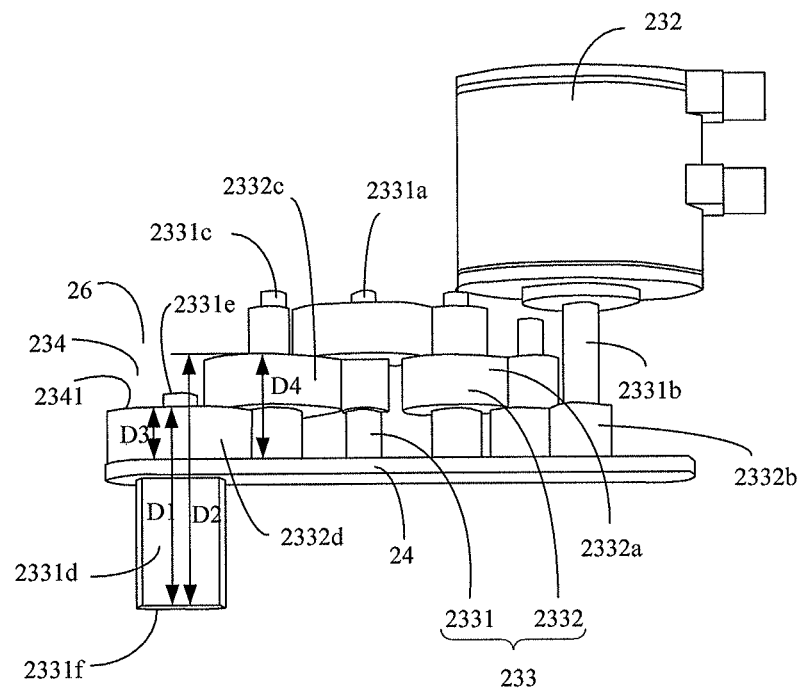
FIG. 5 is a perspective view of a camera assembly according to an embodiment of the present disclosure.

Referring to FIG. 5, the transmission module 233 may include a rotating-shaft group 2331 and a gear group 2332. The rotating-shaft group 2331 may include a number of rotating shafts 2331a. The rotating shafts 2331a may connect the motor 232 and the camera module 231. The gear group 2332 may include a number of gears 2332a. The gears 2332a may be set on the rotating shafts 2331a. The gears 2332a may engage with each other. The motor 232 may drive the rotating shafts 2331a and the gears 2332a to rotate so as to drive the camera module 231 to move.

The rotating shafts 2331a may include a driving shaft 2331b, at least one intermediate shaft 2331c and a driven shaft 2331d. The driving shaft 2331b may connect to the motor 232. The driven shaft 2331d may connect to the camera module 231.

In some embodiments, the multiple rotating shafts 2331a may be set in parallel.

In some embodiments, the camera module 231 may be fixed to the driven shaft 2331. The camera module 231 may rotate around the driven shaft 2331d.

The gears 2332a may include a driving gear 2332b, at least one intermediate gear 2332c and a driven gear 2332d. The driving gear 2332b may set on the driving shaft 2331b. The intermediate gear 2332c may be set on the intermediate shaft 2331c. The driven gear 2332d may be set on the driven gear 2331d.

The gears 2332a may include at least one step part 2341. The step part 2341 may be set corresponding to the concave part 234. The step part 2341 may be set at a side of the gear 2332a far away from the camera module 231, wherein said gear 2332a is set on the rotating shaft 2331a connecting to the camera module 231. The step part 2341 may be set on the surface of the gear 2332a far away from the camera module 231, wherein said gear 2332a is set on the rotating shaft 2331a connecting to the camera module 231. That is, the step part 2341 may be located on the surface of the driven gear 2332d far away from the camera module 231.

In order to clearly describe the structure, the top surface of each of these components is defined as the surface facing towards the motor 232, and the bottom surface of each of these components is defined as the surface facing towards the camera module 231.

The top surface of the driven gear 2332d and the top surface of the adjacent intermediate gear 2332c may be staggered such that an empty space 26 may be formed above the top surface of the driven gear 2332d. The empty space 26 may be used as the clearance area of an antenna radiator 27.

In some embodiments, referring to FIG. 5, the top surface of the driven gear 2332d may be engaged with the bottom surface of the adjacent intermediate gear 2332c, such that an empty space 26 may be formed above the top surface of the driven gear 2332d. The empty space 26 may be used as the clearance area of an antenna radiator 27.

In some embodiments, each rotating shaft 2331a may include a first end 2331e and a second end 2331f oppositely arranged. The first end 2331e of each rotating shaft 2331a may face towards the motor 232 while the second end 2331f of each rotating shaft 2331a may face towards the camera module 231.

The top surface of the first end 2331e of the driven shaft 2331d may be located between the top surface of the driven gear 2332d and the top surface of the intermediate gear 2332c adjacent to the driven gear 2332d, such that an empty space 26 may be formed above the top surface of the driven gear 2332d. The empty space 26 may be used as the clearance area of an antenna radiator 27.

In some embodiments, the top surface of the first end 2331e of the driven shaft 2331d may be located in the same plane as the top surface of the driven gear 2332d, such that an empty space 26 may be formed above the top surface of the driven gear 2332d. The empty space 26 may be used as the clearance area of an antenna radiator 27.

In some embodiments, the distance D1 from the bottom surface of the second end 2331f of the driven shaft 2331d to the top surface of the driven gear 2332d may be less than the distance D2 from the bottom surface of the second end 2331f of the driven shaft 2331d to the top surface of the intermediate gear 2332c adjacent to the driven gear 2332d, such that an empty space 26 may be formed above the top surface of the driven gear 2332d. The empty space 26 may be used as the clearance area of an antenna radiator 27.

Figure 6:
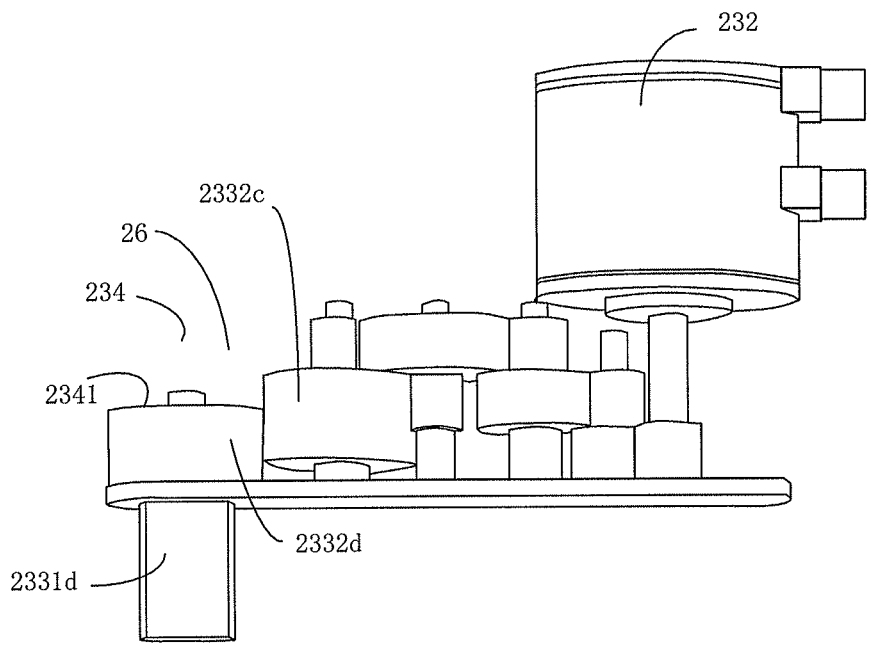
FIG. 6 is a perspective view of a camera assembly according to another embodiment of the present disclosure.

In some embodiments, as shown in FIG. 6, the top surface of the driven gear 2332d may be located between the top surface and the bottom surface of the adjacent intermediate gear 2332c, such that an empty space 26 may be formed above the top surface of the driven gear 2332d. The empty space 26 may be used as the clearance area of an antenna radiator 27.

Figure 7:
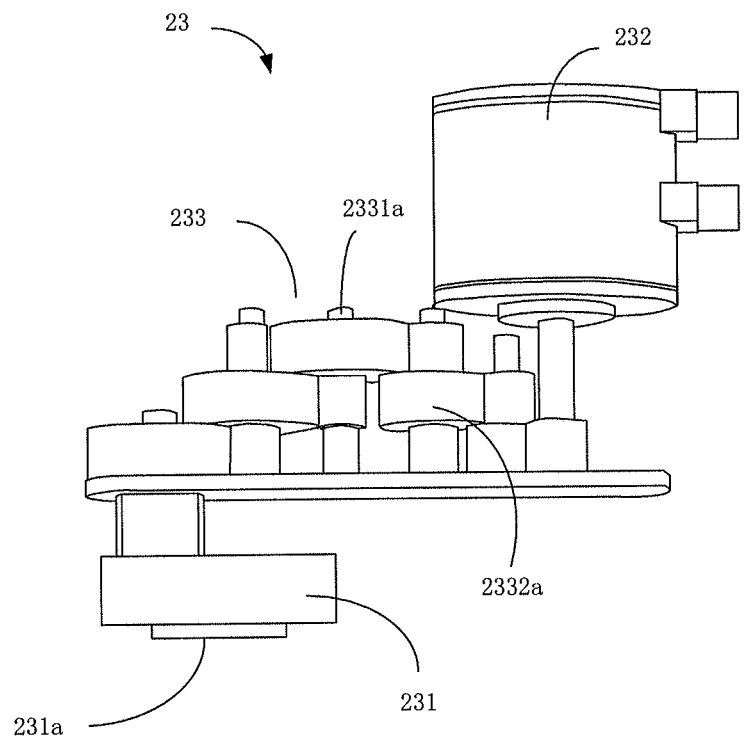
FIG. 7 shows a first state of a camera assembly according to an embodiment of the present disclosure.
Figure 8:
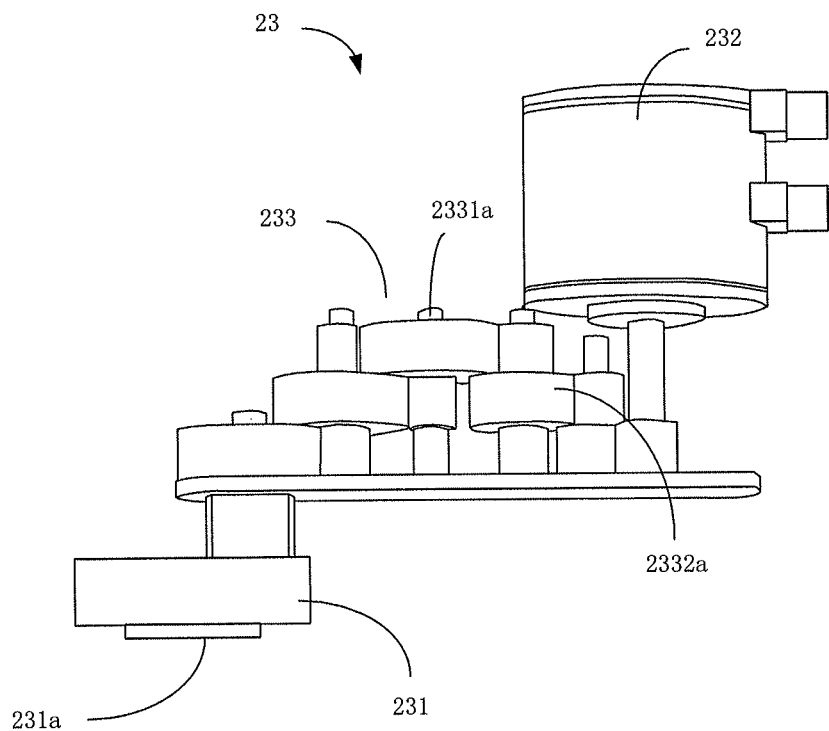
FIG. 8 shows a second state of a camera assembly according to an embodiment of the present disclosure.

Please refer to FIGS. 7-8. In FIG. 7, the camera module 231 is in a first position. The photographing surface 231a of the camera module 231 may face towards a first direction. After the motor 232 drives the rotating shafts 2331a and the gears 2332a to rotate, as shown in FIG. 8, the camera module 231 changes into a second position. In this situation, the photographing surface 231a of the camera module 231 may still face the first direction. In other words, the camera assembly may be utilized for photographing towards the same direction but at different position.

Figure 9:
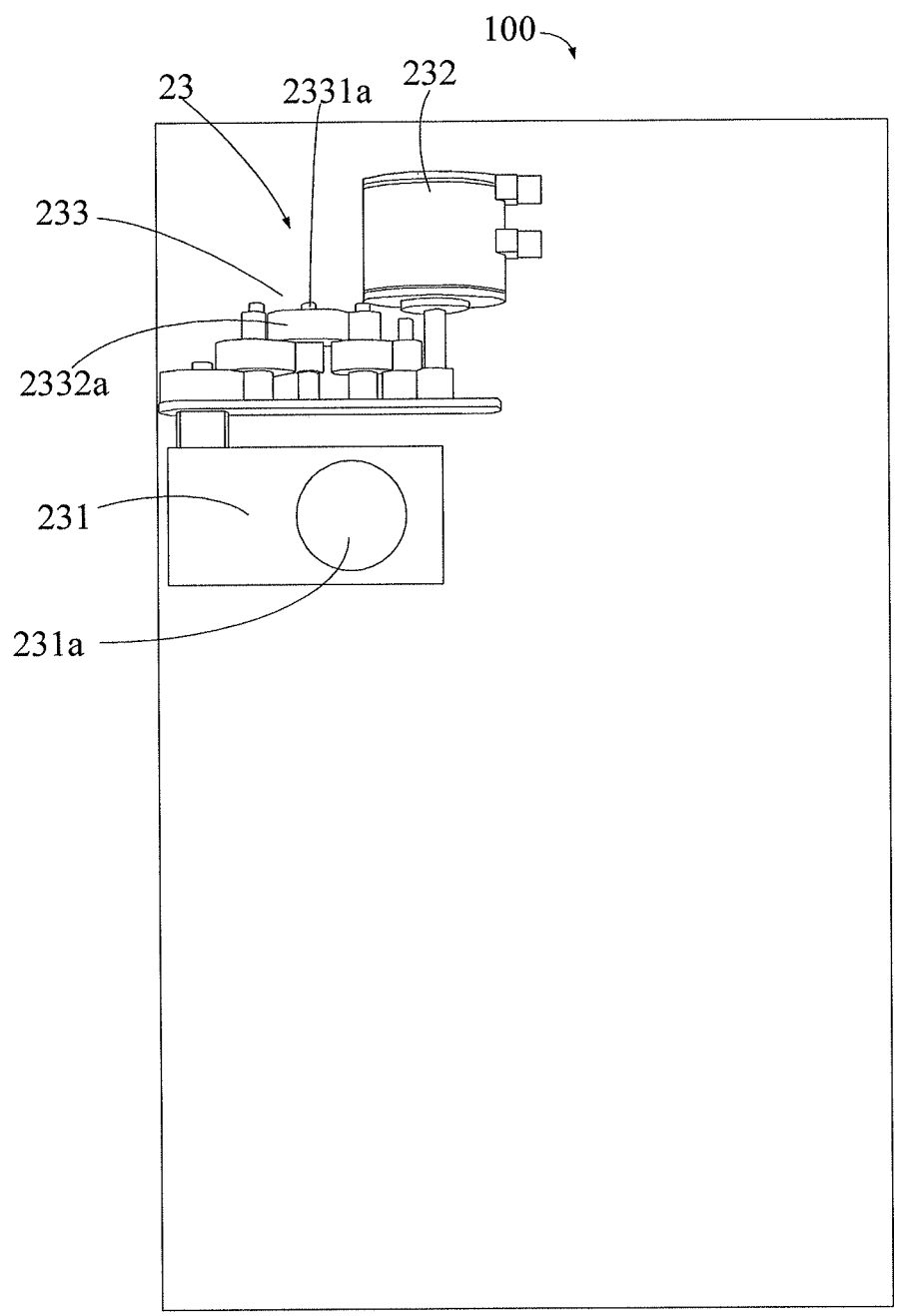
FIG. 9 shows a third state of a camera assembly according to an embodiment of the present disclosure.
Figure 10:
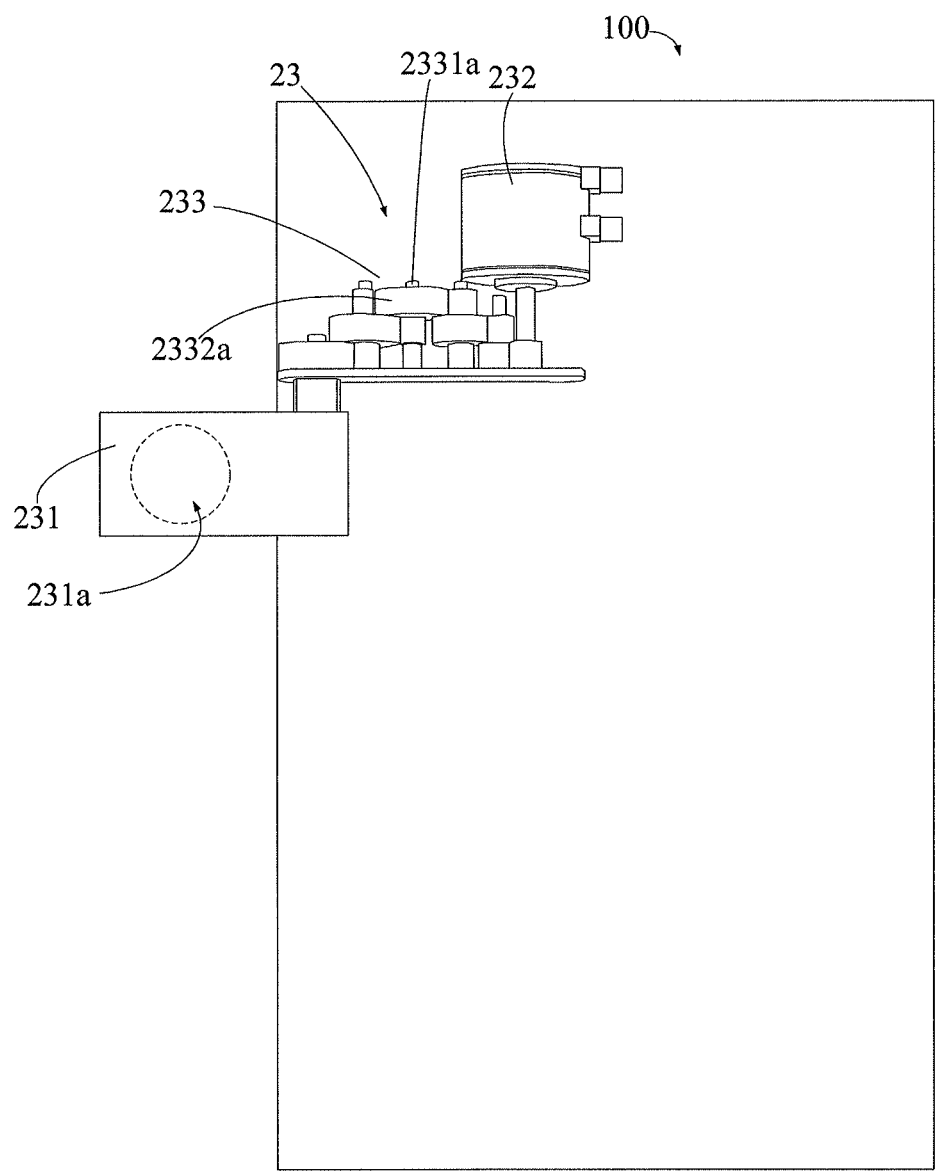
FIG. 10 shows a fourth state of a camera assembly according to an embodiment of the present disclosure.

Please refer to FIGS. 9-10. In FIG. 9, the camera module 231 is in a first position. The photographing surface 231a of the camera module 231 may face towards a first direction. After the motor 232 drives the rotating shafts 2331a and the gears 2332a to rotate, as shown in FIG. 10, the camera module 231 changes into a second position. In this situation, the photographing surface 231a of the camera module 231 may face a second direction opposite to the first direction. In other embodiments, there may exist an angle of 45°, 90°, 120° and the like between the first direction and the second direction. The angle can be acquired by controlling the motor 232 to rotate based on design requirement.

In other embodiments, the motor 232 may drive the transmission module in order to push the camera module 231 outside or to pull the camera module 231 back.

Referring to FIG. 5, the camera assembly 23 may further include an installation plate 24. The transmission module 233 may be installed on the installation plate 24. The motor 232 and the transmission module 233 may be located at one side of the installation plate 24 while the camera module 231 may be located at the other side of the installation plate 24.

In this embodiment, the rotating shafts 2331a may be installed on the installation plate 24. Each rotating shaft 2331a may be substantially perpendicular to the installation plate 24. The second end 2331f of each of the driving shaft 2331b and the intermediate shafts 2331c may be connected to the installation plate 24. The driven shaft 2331d may penetrate and connect to the installation plate 24. The first end 2331e of the driven shaft 2331d may be located at the same side of the installation plate 24 as the driving shaft 2331b and the intermediate shafts 2331c. The second end 2331f of the driven shaft 2331d may be located at the other side of the installation plate 24 opposite to the driving shaft 2331b and the intermediate shafts 2331c. The gears 2332a and the motor 232 may be located at the same side of the installation plate 24 as the driving shaft 2331b and the intermediate shafts 2331c. The camera module 231 may be located at the other side of the installation plate 24 opposite to the driving shaft 2331b and the intermediate shafts 2331c.

In some embodiments, the distance D3 from the top surface of the driven gear 2332d to the installation plate 24 may be less than the distance D4 from the top surface of the intermediate gear 2332c adjacent to the driven gear 2332d to the installation plate, such that an empty space 26 may be formed above the top surface of the driven gear 2332d. The empty space 26 may be used as the clearance area of an antenna radiator 27.

Figure 11:
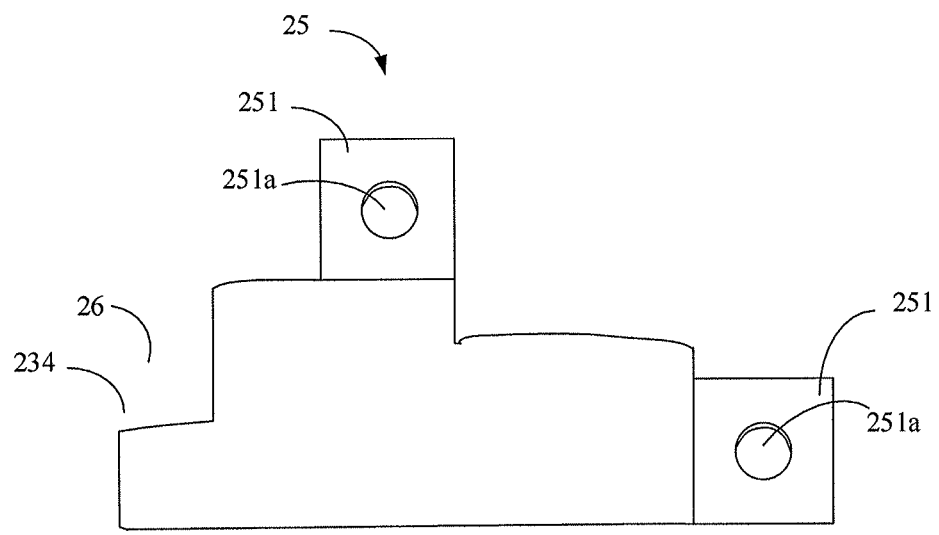
FIG. 11 is a schematic structural view of an installation hood according to an embodiment of the present disclosure.
Figure 12:
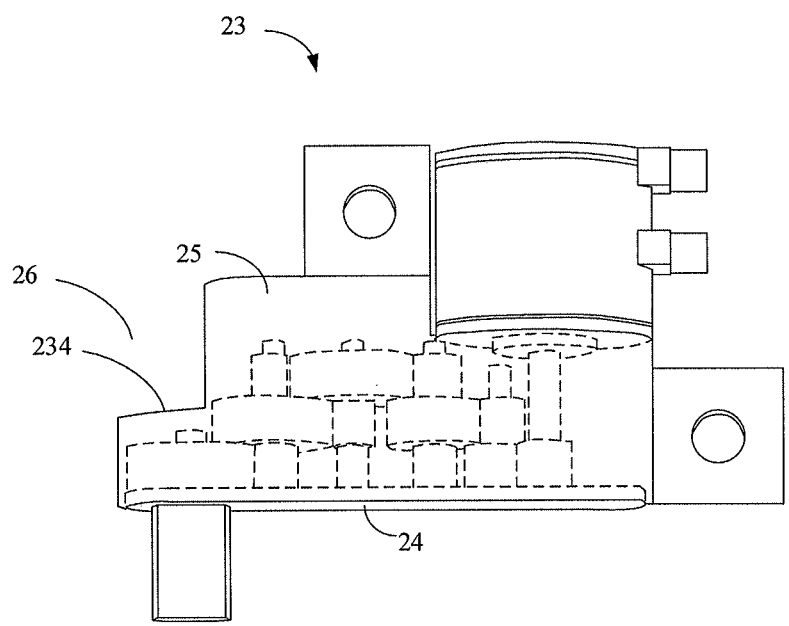
FIG. 12 is a perspective view of a camera assembly according to another embodiment of the present disclosure.

Referring to FIGS. 11-12, in some embodiments, the camera assembly may further include an installation hood 25. The installation hood 25 may cover the transmission module 233.

The motor 232, part of the driven shaft 2331d, the installation plate 24 and the camera module 231 may be located outside the installation hood 25. The installation hood 25 may be fixed to the installation plate 24. The installation hood 25 may include several protrusions 251. On each protrusion 251 there may be formed a through hole 251a for receiving a screw such that the installation hood 25 may be fixed to other components of the electronic device 100. The concave part 234 may be located at the lateral wall of the installation hood 25 to form an empty space 26. The empty space 26 may be used as the clearance area of an antenna radiator 27.

Figure 13:
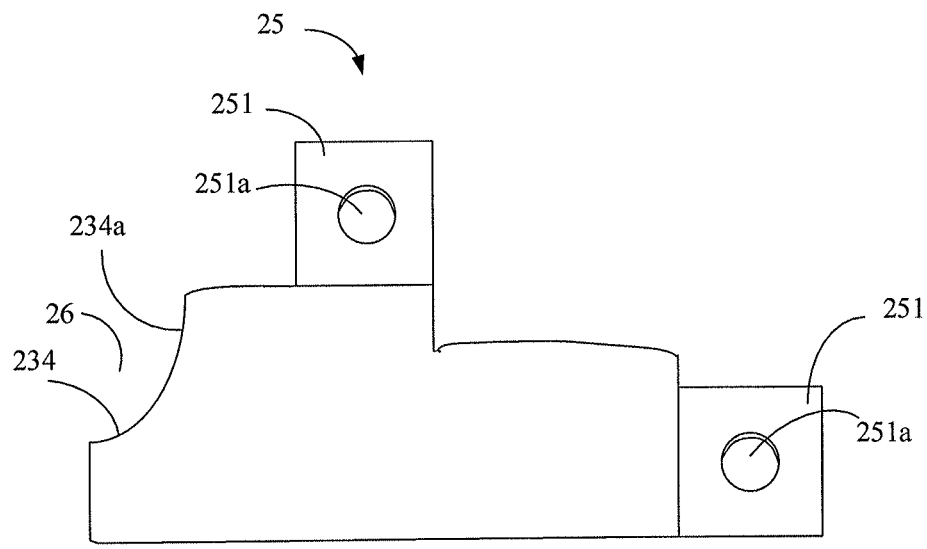
FIG. 13 is a schematic structural view of an installation hood according to another embodiment of the present disclosure.
Figure 14:
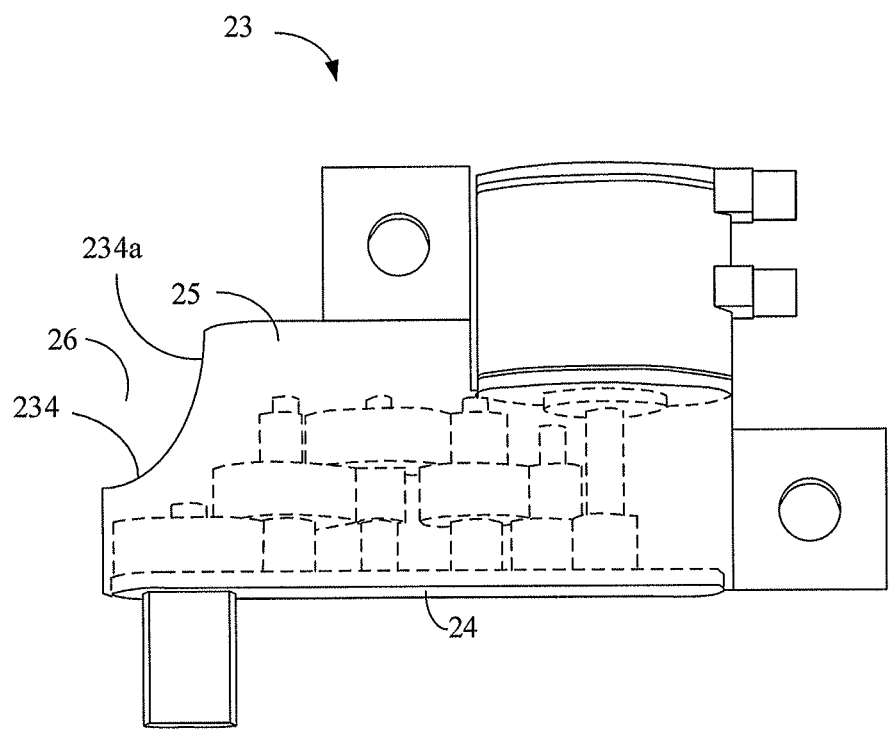
FIG. 14 is a perspective view of a camera assembly according to another embodiment of the present disclosure.

In some embodiments, referring to FIGS. 13-14, the concave part 234 may be a curved structure 234a formed on the lateral wall of the transmission module 233, which matches the shape of the electronic component disposed in the empty space 26. Thus, the manufacturing difficulty may be reduced.

Figure 15:
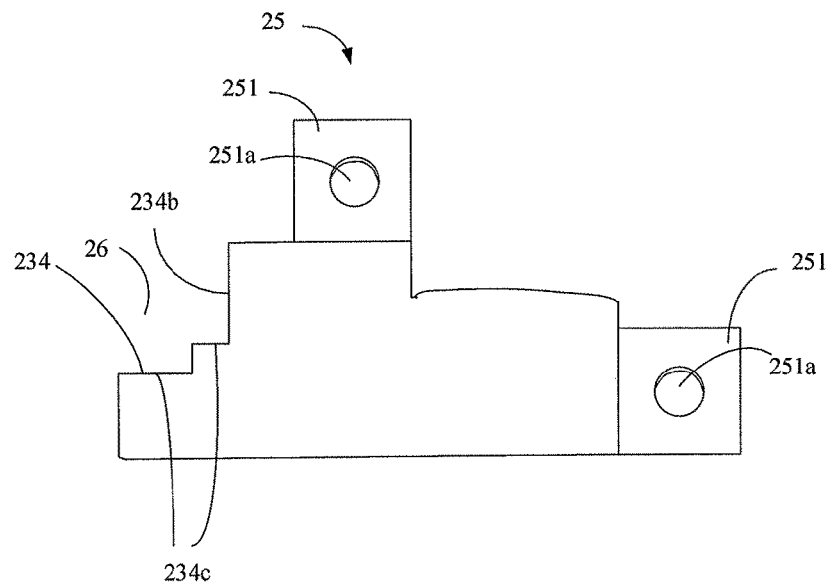
FIG. 15 is a schematic structural view of an installation hood according to another embodiment of the present disclosure.
Figure 16:
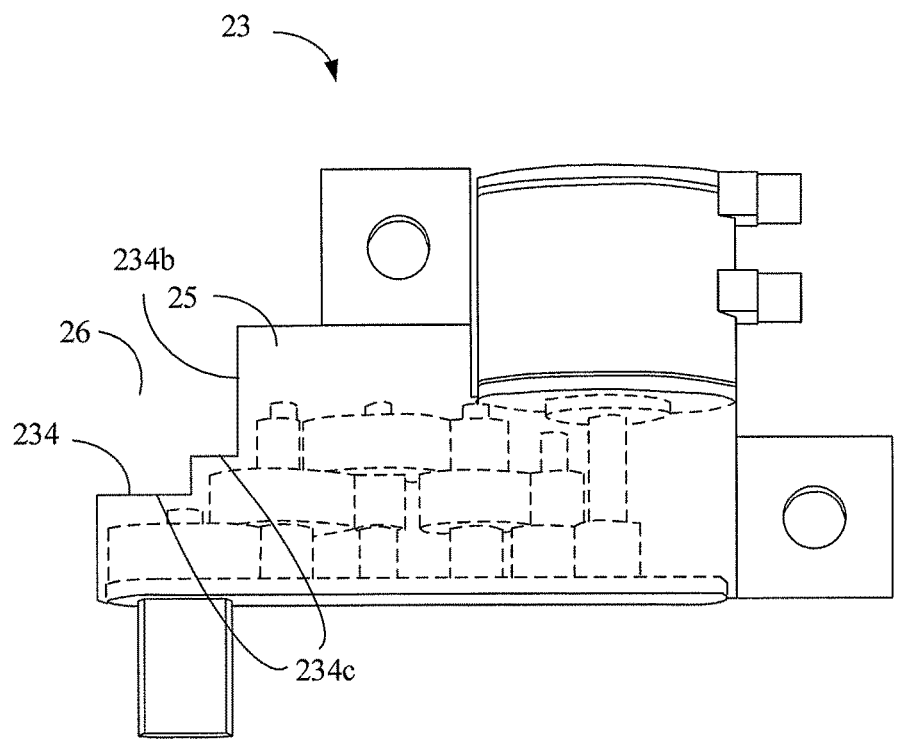
FIG. 16 is a perspective view of a camera assembly according to another embodiment of the present disclosure.

In other embodiments, referring to FIGS. 15-16, the concave part 234 may be a step-shaped structure 234b formed on the lateral wall of the transmission module 233. The step-shaped structure 234b may include several step surfaces 234c which matches better the outlines of the transmission module 233. Thus, the empty space 26 may be enlarged.

Referring to FIG. 1, the circuit board 31 may be installed in the electronic device 100. The circuit board 31 may be the main board of the electronic device 100. The circuit board 31 may be integrated with at least one of a motor 232, a microphone, a loudspeaker, a headphone jack, a USB interface, a camera module 23, a distance sensor, an environment light sensor, a sound receiver or a processor. The headphone jack may be located corresponding to the location of the headphone hole 105. The microphone may be located corresponding to the location of the microphone hole 106. The USB interface may be located corresponding to the location of the USB hole 107. The loudspeaker may be located corresponding to the location of the loudspeaker hole 108.

In some embodiments, the circuit board 31 may be fixed inside the electronic device 100. Specifically, the circuit board 31 may be fixed to the driving device 23 by screws or clips. It should be noted that the fixation method of the circuit board 31 and the driving device 23 is not limited in the present disclosure, and other method may also be employed. For example, screws and clips may both be utilized at the same time for fixation.

The battery 32 may be installed in the electronic device 100. The battery 32 may be electrically connected to the circuit board 31 so as to supply power to the electronic device 100. The back case 102 may be the battery case of the battery 32. The back case 102 may cover and protect the battery 32. Specifically, the back case 102 may cover and protect the battery 32 from damage due to collision and drop.

According to the embodiments of the camera assembly and the electronic device provided in the present disclosure. The camera assembly may include a camera module, a motor and a transmission module. The transmission module may be connected between the camera module and the motor. The motor may be utilized to drive the transmission module so as to drive the camera module to move. The transmission module may have at least one concave part. The concave part may be formed on the lateral wall of the transmission module such that an empty space may be formed above the concave part. In the electronic device, the empty space may be used as the clearance area of the antenna radiator of the electronic device. Therefore, the performance of the antenna installed close to the camera module may be improved.

Embodiments of the camera assembly and the electronic device provided by the present disclosure have been described in detail, and principles and embodiments of the present disclosure have been elaborated with reference to specific examples. However, the description of the above embodiments is merely used to assist in understanding the present disclosure and its core idea. It is conceivable for those skilled in the art to make changes in the specific embodiments and application areas according to the idea of the present disclosure. The description should not be construed to limit the present disclosure.

What is claimed is:

1. A camera assembly, comprising:
a camera module;
a motor; and
a transmission module connected between the camera module and the motor, wherein the motor is configured to drive the transmission module so as to drive the camera module to move, and the transmission module defines at least one concave part set on a lateral wall of the transmission module
wherein, the transmission module comprises a rotating-shaft group and a gear group; the rotating-shaft group comprises a plurality of rotating shafts connecting the motor and the camera module; and the gear group comprises a plurality of gears arranged on the plurality of rotating shafts, wherein the plurality of gears engage with each other;
wherein, the gear group comprises at least one step part, the concave part is located corresponding to the step part, and the step part is set at a side of the plurality of gears far away from the camera module.

2. The camera assembly of claim 1, wherein
the at least one concave part is a curved structure formed on the lateral wall of the transmission module; or
the at least one concave part is a step-shaped structure formed on the lateral wall of the transmission module.

3. The camera assembly of claim 1, wherein
the plurality of rotating shafts comprise a driving shaft, at least one intermediate shaft and a driven shaft, the driving shaft connects to the motor, and the driven shaft connects to the camera module;
the plurality of gears comprise a driving gear, at least one intermediate gear and a driven gear, the driving gear is set on the driving shaft, the at least one intermediate gear is set on the at least one intermediate shaft, and the driven gear is set on the driven shaft; and
the step part is located at a top surface of the driven gear.

4. The camera assembly of claim 3, wherein
the top surface of the driven gear is staggered with a top surface of an adjacent one of the at least one intermediate shaft.

5. The camera assembly of claim 3, wherein
each of the plurality of rotating shafts comprises a first end and a second end oppositely arranged, the first end of each of the plurality of rotating shafts faces towards the motor, and the second end of each of the plurality of rotating shafts faces towards the camera module;
a top surface of a first end of the driven shaft is located between a top surface of the driven gear and a top surface of an adjacent one of the at least one intermediate gear.

6. The camera assembly of claim 5, wherein
a distance from a bottom surface of the second end of the driven shaft to a top surface of the driven gear is less than a distance from a bottom surface of the second end of the driven shaft to a top surface of the at least one intermediate gear adjacent to the driven gear.

7. The camera assembly of claim 3, further comprising:
an installation plate, wherein the transmission module is installed on the installation plate, the motor and the transmission module are located at one side of the installation plate, and the camera module is located at the other side of the installation plate.

8. The camera assembly of claim 7, wherein
a distance from a top surface of the driven gear to the installation plate is less than a top surface of the at least one intermediate gear adjacent to the driven gear to the installation plate.

9. The camera assembly of claim 1, further comprising:
an installation hood covering the transmission module, wherein the concave part is located on the lateral wall of the installation hood.

10. A camera assembly for electronic device, comprising:
a camera module;
a motor; and
a transmission module connected between the camera module and the motor, wherein the transmission module define at least one concave part located on a lateral wall of the transmission module;
wherein the transmission module is capable of driving the camera module to switch between a first position and a second position, the camera module is located inside the electronic device when switching to the first position, and the camera module is located outside the electronic device when switching to the second position;
wherein, a photographing surface of the camera module faces a first direction when the camera module is in the first position;
a photographing surface of the camera module faces a second direction different from the first direction when the camera module is in the second position.

11. The camera assembly of claim 10, wherein
a photographing surface of the camera module faces a same direction when the camera module is in the first position and the second position.

12. The camera assembly of claim 10, wherein
the transmission module comprises a rotating-shaft group and a gear group;
the rotating-shaft group comprises a plurality of rotating shafts connecting the motor and the camera module, and is configured to rotate the camera module to the first position or the second position;
the gear group comprises a plurality of gears arranged on the plurality of rotating shafts;
the gear group comprises at least one step part, the concave part is located corresponding to the step part, and the step part is set at a side of the plurality of gears far away from the camera module.

13. The camera assembly of claim 12, further comprising:
an installation hood covering the transmission module, wherein the installation hood has an outer contour corresponding to the step part, and the concave part is formed outside the hood and corresponding to the location of the step part.

14. An electronic device, comprising:
a camera assembly comprising:
a camera module;
a motor; and
a transmission module connected between the camera module and the motor, wherein the motor is configured to drive the transmission module so as to drive the camera module to move, and the transmission module defines at least one concave part set on a lateral wall of the transmission module; and
an antenna radiator located corresponding to the at least one concave part, wherein the at least one concave part is located between the antenna radiator and the transmission module to form an antenna clearance area;
wherein, the transmission module comprises a rotating-shaft group and a gear group;
the rotating-shaft group comprises a plurality of rotating shafts connecting the motor and the camera module;
the gear group comprises a plurality of gears arranged on the plurality of rotating shafts, wherein the plurality of gears engage with each other; and
the gear group comprises at least one step part, the concave part is located corresponding to the step part, and the step part is set at a side of the plurality of gears far away from the camera module.

15. The electronic device of claim 14, wherein
the plurality of rotating shafts comprise a driving shaft, at least one intermediate shaft and a driven shaft, the driving shaft connects to the motor, and the driven shaft connects to the camera module;
the plurality of gears comprise a driving gear, at least one intermediate gear and a driven gear, the driving gear is set on the driving shaft, the at least one intermediate gear is set on the at least one intermediate shaft, and the driven gear is set on the driven shaft; and
the step part is located at a top surface of the driven gear.

16. The electronic device of claim 15, further comprising:
an installation plate, wherein the transmission module is installed on the installation plate, the motor and the transmission module are located at one side of the installation plate, and the camera module is located at the other side of the installation plate; and
an installation hood covering the transmission module, wherein the concave part is located on the lateral wall of the installation hood.

* * * * *